United States Patent [19]

Bjurling

[11] 4,363,574

[45] Dec. 14, 1982

[54] METHOD OF EMPTYING A POWDER OR LIKE MATERIAL OUT OF A CONTAINER

[75] Inventor: Anders Bjurling, Skultuna, Sweden

[73] Assignee: Dynatrans AB, Frolunda, Sweden

[21] Appl. No.: 201,398

[22] PCT Filed: Mar. 5, 1980

[86] PCT No.: PCT/SE80/00064

§ 371 Date: Oct. 29, 1980

§ 102(e) Date: Oct. 29, 1980

[87] PCT Pub. No.: WO80/01904

PCT Pub. Date: Sep. 18, 1980

[30] Foreign Application Priority Data

Mar. 5, 1979 [SE] Sweden .............................. 7901936

[51] Int. Cl.³ ............................................. B65G 53/40
[52] U.S. Cl. ..................................... 406/114; 222/160;
222/167; 406/118; 406/137
[58] Field of Search ................... 222/1, 160, 164, 167;
414/419, 421; 406/95, 113–115, 117, 118,
136–138

[56] References Cited

U.S. PATENT DOCUMENTS

| 1,922,330 | 8/1933 | Robinson | 406/114 |
| 2,219,208 | 10/1940 | Knight | 406/137 |
| 2,256,561 | 9/1941 | Hoelscher | 406/137 |
| 2,501,047 | 3/1950 | Gustafsson et al. | 406/136 |
| 2,518,514 | 8/1950 | Anderson | 406/118 |
| 2,643,796 | 6/1953 | Gustafson | 222/167 |
| 2,678,238 | 5/1954 | Schutz | 222/167 X |

Primary Examiner—Jeffrey V. Nase
Attorney, Agent, or Firm—Laurence R. Brown

[57] ABSTRACT

Method of emptying a powder or like material out of a container.

The powder (9) is conveyed out of the container (1) from its free upper surface by means of a stream of carrier air in a carrier-air pipe (6; 10; 12) provided with openings for the powder. The emptying is facilitated by means of a stream of secondary air from a secondary-air pipe (7; 11; 13). The container is rotated so that the fixed carrier-air pipe may come into the vicinity of the surface of the powder.

2 Claims, 5 Drawing Figures

METHOD OF EMPTYING A POWDER OR LIKE MATERIAL OUT OF A CONTAINER

TECHNICAL FIELD

The present invention relates to a method of emptying a powder or like material out of a container.

PRIOR ART

So-called bulk handling of powdered material has increased and may be expected to increase further in extent in future. Typical examples of materials which can be bulk handled are lime, cement, flour, fertilizer, resin etc. but other materials which are difficult to handle such as electrode filter dust and sticky powdered fodder occur.

Powder material is emptied (after transport by road or railway) out of the vehicle by means of compressed air or by tipping.

Heavy powder material is often transported in almost spherical containers which are subjected to excess pressure during emptying, while at the same time a stream of carrier air is blown into the discharge pipe at the lower part of the container. The material is "fluidized". Spherical containers afford a poor utilization of volume.

Light powder material can be transported, particularly in road vehicles, in horizontal cylindrical containers or silos (so-called bulk containers). Emptying can be effected by tipping, particularly with coarse grained material, while at the same time an internal excess pressure may prevail in the container. A container length of 10–12 m and an emptying angle of 45° provides an obvious element of risk, for example the risk of tipping with gusts of wind. If the container then cracks, a powerful explosion may occur because of the excess pressure with consequent damage to life and property.

With both these methods of emptying, the emptying is effected in what is in itself the most natural manner, namely from the bottom. A serious common disadvantage with both methods is the risk of arching with consequent serious risky disturbances in connection with the emptying. At present attempts are made with varying success to avoid arching by means of vibrators, sound typhoons and like aids.

It is also known already to empty upright containers from the top. Here a shaft is used in the container (the silo). This consists of small tubular elements which, by means of guide and lifting members, can form an emptying gap in the shaft at the surface of the powder in order to empty the powder by the force of gravity. The device is comparatively expensive and complicated, so that disturbances in operation are not excluded.

THE INVENTION

The advantage of emptying from the top—the powder is not packed at the surface—by so-called surface runoff, can be utilized and all the disadvantages of previously known methods avoided if, according to the invention, the powder is conveyed out of the container from its free upper surface by means of a stream of carrier air in a carrier-air pipe provided with openings for the powder. In order to achieve a reliable introduction of the powder into the carrier-air pipe at all its openings, a stream of secondary air from a secondary-air pipe should be caused to flow to the openings in the carrier-air pipe. If the container is horizontal and cylindrical, the container with a carrier-air pipe fixed therein, should be turned about its longitudinal axis so that the pipe is always in a suitable position at the surface of the powder.

LIST OF FIGURES

The invention will be described in more detail below with reference to the accompanying drawings in which FIG. 1 shows in perspective a cylindrical container with members for emptying according to the invention, FIGS. 2–4 show, in suitable cross-sections through cylindrical containers, three different embodiments of the invention and FIG. 5 is a partial longitudinal section on the line V—V in the embodiment according to FIG. 3.

DESCRIPTION OF PREFERRED EMBODIMENTS

Figure 1:
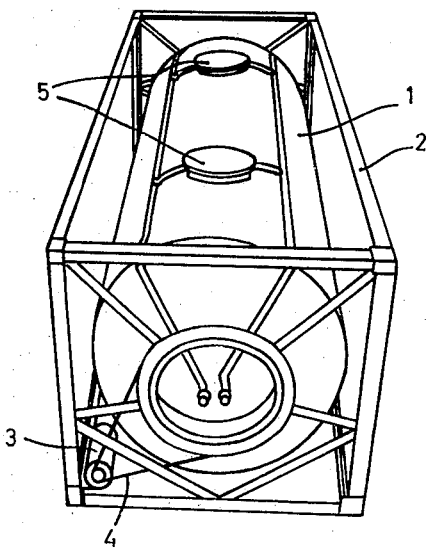

A cylindrical container 1 shown in FIG. 1 is disposed horizontally in a framework 2 to form together with this a so-called tank container or bulk container. As can be seen from the drawing, the container 1 is rotatable about its longitudinal axis in the framework. In the case shown, the rotation can be effected by means of a motor 3 fixed in the framework 2 and a drive belt or chain 4. Conceivable alternatives for transmitting the rotary movement to the container are screw worms and compressed-air cylinders. The container 1 is provided in conventional manner with manholes 5 and a pipe system for emptying which is described in more detail below and only indicated in the drawing.

Figure 2:
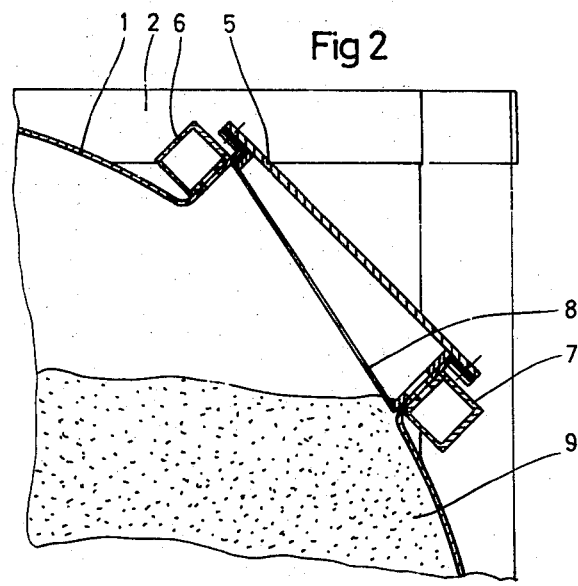

The embodiment of the emptying device which is indicated in FIG. 1 is shown more clearly in FIG. 2 where parts of the cylindrical container 1, the framework 2 and a manhole 5 are shown.

At each side of the manholes 5 or more correctly of the necks of the manholes, there extends in the longitudinal direction of the container an emptying pipe or carrier-air pipe 6 and a secondary-air pipe 7. These pipes 6 and 7 may either extend, as indicated in FIG. 1, at some distance from the manholes 5 and have short connecting pipes to the necks of the manholes or, as indicated in FIG. 2, bear against the necks of the manholes and be in communication with the interior of the container 1 through openings.

As seen in FIG. 2, the manhole 5 may be provided at the inside with an oblique, permeable screen cloth 8, the purpose of which is to distribute a stream of air coming from the secondary-air pipe 7 over the surface of the manhole.

The emptying or carrier-air pipe 6 is connected at one end to a receiving silo or the like, not shown, and a stream of carrier air in the direction of this silo is produced in the pipe. The secondary-air pipe 7 is connected to a blower, not shown, and is closed at its other end so that the stream of secondary air therein is forced to go via the screen cloth 8 into the carrier-air pipe 6, which may likewise be connected to a blower, not shown (which may or may not be the same as for the secondary-air pipe).

The emptying of a powder 9 or the like from the container 1, the starting position being that the manholes 5 are fitted and are in their vertical transport position as shown in FIG. 1, takes place in the following manner:

Before the actual emptying, first the carrier-air pipe 6 and then the necks of the manholes are blown clean (by means of air from the secondary-air pipe 7). Any powder in the necks of the manholes accompanies the carrier air to the receiving silo.

After this and with the streams of carrier air and secondary air or pressure regulated to a suitable extent by adjustable throttling, a slow rotation of the container begins so that the powder can be "seized" by the stream of secondary air and transported into the carrier-air pipe and through this to the receiving silo.

The emptying method illustrated in FIG. 2, where the powder 9 is blown up by the stream of secondary air from the pipe 7 to the carrier-air pipe 6 can be utilized primarily with very light powder or the like. The "opposite" method, with the carrier-air pipe 6 lower and the secondary-air pipe 7 higher, when the powder 9 therefore falls down into the carrier-air pipe 6, is more suitable for heavier powder which is more difficult to handle. Nevertheless, the device is the same in both cases, which is an advantage.

Depending on whether the powder flows easily or with difficulty, different movement patterns for the rotation may be suitable. For powder which flows easily, the container can be rotated steadily in one and the same direction. For powder which flows with difficulty, a rocking, oscillating movement may be suitable so that the powder slides down from the surface to the necks of the manholes.

When the container 1 has been turned through half a revolution and the manholes 5 therefore face downwards, the rotational movement can change over into a rocking motion so that the tank is completely emptied.

Figure 3:
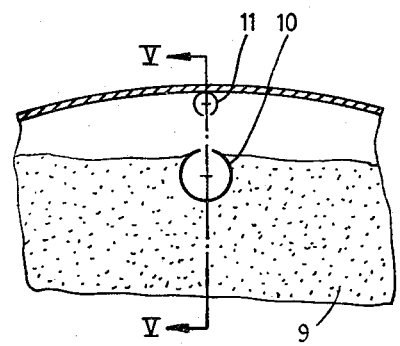
Figure 5:
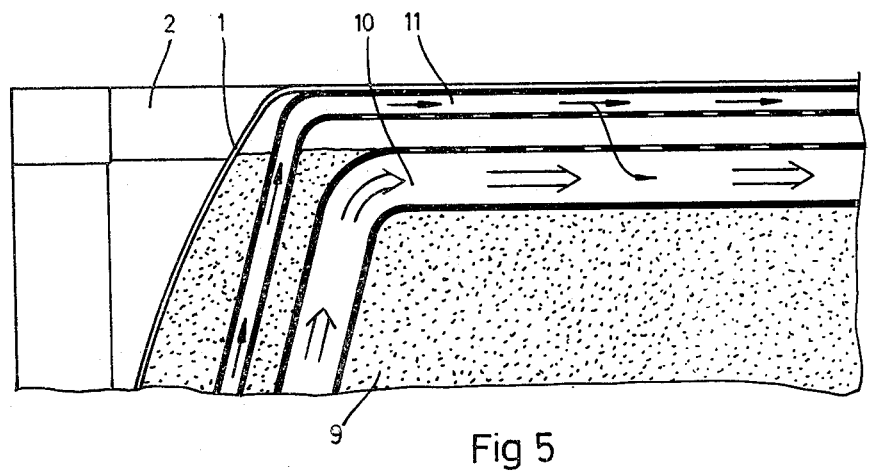

Another embodiment is illustrated in FIG. 3 (cross section) and FIG. 5 (longitudinal section). In this case an emptying or carrier-air pipe 10, which is perforated or provided with slits along its whole length, extends inside the container 1. The holes or slits face outwards towards the container wall, and between this and the carrier-air pipe 10 there extends a secondary air pipe 11. This pipe 11 likewise has perforation holes or slits facing towards the carrier-air pipe 10. The spacing between the two pipes 10 and 11 is comparatively small.

The remaining equipment (for rotation, generating the streams of air etc) is comparable with that for the embodiment according to FIG. 2 and the method of emptying is the same as with this embodiment: blowing the carrier-air pipe and secondary-air pipe clean, rotation and emptying by streams of air.

Figure 4:
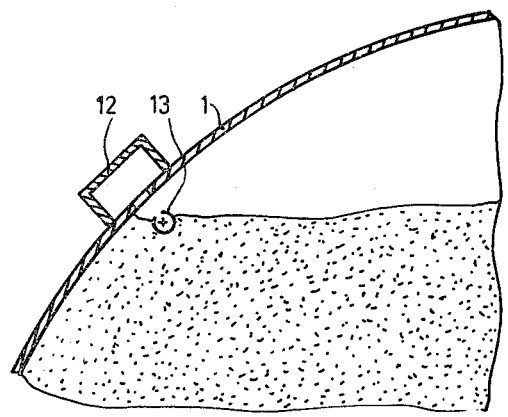

FIG. 4 illustrates a third embodiment. Here a carrier-air pipe 12 extends outside and along the container 1, and holes or passages extend through the container wall. A secondary-air pipe 13 with perforation holes or slits along its whole length, facing towards the carrier-air pipe 12, extends inside the container 1 near the carrier-air pipe.

The remaining equipment and method of emptying are the same as with the other embodiment above.

With these last two embodiments, however, it should be particularly noted that the carrier-air pipe should be at the top during transport so as not to be blocked by the powder or like material in the container.

The first embodiment (FIGS. 1 and 2) is reliable but provides a comparatively slow emptying, particularly when complete emptying is required. The distribution of the secondary air over the screen cloths in the necks of the manholes means that the powder is activated and does not block the carrier-air pipe so easily.

The method of emptying with the other forms of embodiment (FIGS. 3 and 5) is cheapest and most elegant. Nevertheless problems may arise when complete emptying is required. The emptying time is considerably shorter. From this point of view, the third embodiment (FIG. 4) is practically equivalent, but the risk of blockage of the pipes may be greater.

As a result of the fact that the container 1 is rotatable, the advantage is achieved that the container can be filled better than with a conventional construction. During filling through the manholes 5, the spaces between the manholes remain unfilled (to a varying extent depending on the angle of slope of the material). If the container is now rotated a few turns, after closing the manholes, the final filling can take place. Such a procedure can be repeated several times.

ALTERNATIVE EMBODIMENT

The embodiments discussed hitherto are all based on the principle with a carrier-air stream and a secondary-air stream, the basic idea being that, as a result, a satisfactory transport of material is obtained in and through the carrier-air pipe and a uniform introduction of powder into this pipe along its whole length (or, with the embodiment as shown in FIGS. 1 and 2, at all the manholes).

An embodiment with only a carrier-air stream in a perforated or slit pipe provided for the purpose at the surface of the powder is also within the scope of the invention, however. The air pressure in the container can be maintained atmospheric, for example by opening a cover, and the powder can be caused to enter the pipe through gravitation forces and/or ejector action.

I claim:

1. The method of emptying a powder or like material out of a cylindrical, rotatable horizontally disposed container having a longitudinal axis by means of a substantially horizontally disposed carrier-air pipe with perforations along its length, comprising the steps of, locating said carrier-air pipe axially along the upper free surface of the powder in said container, passing a stream of carrier-air through an air pipe with perforations along its length disposed parallel to the carrier-air pipe to entrain powder into the perforations of the carrier-air pipe and convey the powder out of the container, and rotating the container about its axis to position the carrier-air pipe along said upper free surface to maintain the carrier-air pipe at said upper free surface.

2. The method of claim 1 including the step of introducing powder into the carrier-air pipe uniformly along the length of the pipe.

* * * * *